(12) United States Patent
Ramage et al.

(10) Patent No.: US 8,379,821 B1
(45) Date of Patent: Feb. 19, 2013

(54) PER-CONFERENCE-LEG RECORDING CONTROL FOR MULTIMEDIA CONFERENCING

(75) Inventors: John Gerow Ramage, Westfield, NJ (US); Benjamin J. Stern, Morris Township, Morris County, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1522 days.

(21) Appl. No.: 11/281,893

(22) Filed: Nov. 18, 2005

(51) Int. Cl.
*H04M 3/42* (2006.01)
(52) U.S. Cl. .............................. 379/202.01; 379/204.01
(58) Field of Classification Search .................. 455/516, 455/518, 416; 379/88.13, 202.01, 67.1, 204.01, 379/68; 348/14.07, 14.09, 14.08
See application file for complete search history.

(56) References Cited

U.S. PATENT DOCUMENTS

| | | | |
|---|---|---|---|
| 4,965,819 A | 10/1990 | Kannes | |
| 5,382,972 A * | 1/1995 | Kannes | 348/14.07 |
| 5,414,754 A | 5/1995 | Pugh et al. | |
| 5,710,591 A | 1/1998 | Bruno et al. | |
| 5,867,562 A | 2/1999 | Scherer | |
| 5,916,302 A | 6/1999 | Dunn et al. | |
| 5,978,463 A | 11/1999 | Jurkevics et al. | |
| 6,148,068 A | 11/2000 | Lowery et al. | |
| 6,188,751 B1 | 2/2001 | Scherer | |
| 6,219,638 B1 | 4/2001 | Padmanabhan et al. | |
| 7,058,168 B1 * | 6/2006 | Knappe et al. | 379/204.01 |
| 2003/0083086 A1 * | 5/2003 | Toyryla et al. | 455/518 |
| 2003/0112947 A1 * | 6/2003 | Cohen | 379/202.01 |
| 2003/0235377 A1 * | 12/2003 | Miyokawa et al. | 385/92 |
| 2004/0114746 A1 * | 6/2004 | Caspi et al. | 379/202.01 |
| 2005/0053214 A1 * | 3/2005 | Reding et al. | 379/202.01 |
| 2005/0215273 A1 * | 9/2005 | Ito | 455/518 |
| 2005/0273510 A1 * | 12/2005 | Schuh | 709/225 |
| 2006/0164507 A1 * | 7/2006 | Eshkoli et al. | 348/14.09 |
| 2007/0058795 A1 * | 3/2007 | Arrant et al. | 379/202.01 |

* cited by examiner

*Primary Examiner* — Yuwen Pan
*Assistant Examiner* — Sonia Gay
(74) *Attorney, Agent, or Firm* — Greenblum & Bernstein, P.L.C.

(57) ABSTRACT

A method and system of controlling recordation and transmission of audio and video signals on a per-conference-leg basis are described. By providing a recordation and transmission control mechanism, teleconference participants may request to go "off-the-record." A per-conference-leg recording and transmission control system enhances the flexibility of teleconference participant's interaction with one or more other participants. The control system and method may further allow a single individual to control the recordation and transmission of the teleconference or alternatively, grant each participant individual control over their own conference leg.

20 Claims, 6 Drawing Sheets

PER-CONFERENCE-LEG RECORDING CONTROL FOR MULTIMEDIA CONFERENCING

FIELD OF THE INVENTION

The invention relates generally to a method and a system of controlling communications in a teleconference. Specifically, the invention relates to controlling and managing the recordation of specified communication signals in a teleconference.

BACKGROUND OF THE INVENTION

As businesses and communities expand globally, the use of telephonic communications and other technologies have become vital in bridging the distances between offices and employees. These telephonic technologies have permitted individuals or groups of individuals to communicate with one another over significant distances in a setting that simulates an in-person meeting. Examples of such telephonic technologies include cellular telephones, call forwarding services, multimedia teleconferencing and internet telephony. For instance, cellular technology has provided a means for reaching an individual who may not be in proximity to a landline telephone. Similarly, video and non-video teleconferencing capabilities permit individuals (hereinafter, participants, attendees, conferees) to participate in a meeting without requiring each participant's physical presence in a single location. Thus, with these various telephonic technologies, co-workers in offices in different parts of the world are able to interact effectively in a virtual in-person meeting environment.

Modern teleconferencing technologies have developed the capability to handle teleconferences involving substantial numbers of participants. In addition, teleconferencing systems now provide advanced features such as teleconference recording and transcription. Recordation of conferences and meetings are gaining increasing importance as issues of accountability on both a business and individual level are becoming more prone to scrutiny. However, one significant disadvantage of current teleconferencing systems and methods is their inability to reproduce the benefits of speaking "off-the-record," an often critical ability available in true in-person conferences and meetings. While modern systems allow for the deactivation of the recording of an entire meeting (i.e., no attendee is recorded), they do not provide the flexibility to record only specific legs (i.e., the audio, video, text and/or still image signals from a particular participant) of a teleconference. For example, a teleconference participant may request that the teleconference system disable the recording of his leg while maintaining the recording status of all other conference legs. Current systems would be unable to handle such a request as they are limited to toggling a basic recording on/off switch for the entire teleconference. As such, this limitation of modern teleconferencing systems may negatively constrain the level of interaction between conference participants.

Additionally, current teleconferencing methods broadcast audio and video from a conferee to all other conferees. As such, teleconference participants lose the ability to engage in a private conversation with another participant or participants with modern teleconferencing methods. In one instance, a teleconference participant may wish to make a private remark to another teleconference participant. Since current systems lack a method of allowing participants to conduct private conversations within a teleconferencing environment, the "private" remarks would be broadcast to all attendees. Thus, the lack of a method to handle private conversations within a teleconference may further limit the productivity and flexibility of such meetings.

For the foregoing reasons, a method and system of enhancing the flexibility of video and non-video teleconference recordation and control is needed.

BRIEF SUMMARY OF THE INVENTION

Many of the aforementioned problems are solved by providing a method and system of per-conference-leg control for multimedia conferencing. With such a control system, a teleconference attendee would be able to disable the recordation of his or her conference leg during a meeting without affecting the recording status of other conference legs. For example, a meeting participant may want to disclose confidential information that is not relevant to the subject matter of the meeting and thus, should not be recorded. To protect confidentiality, the participant may disable the recording of his or her leg of the meeting or alternatively, request that a meeting moderator deactivate the recording. Even though a participant may disable the recording of the conference leg, the audio, video, text or images from his or her leg of the conference may still be broadcast in normal teleconferencing fashion to the other participants. Additionally, multiple conference participants may disable recording of their respective conference legs at one time.

In another aspect of the invention, meeting participants may disable or limit transmission of communication signals originating from a particular conference leg. This aspect of the invention allows a participant to make private comments to one or more designated participants during the teleconference without fear of being heard by or disturbing others. In one example, a board meeting participant may wish to make a private remark about the financial outlook of the company to another board member. The board meeting participant may request that audio and/or video from his or her conference leg be broadcast only to that one specific board member.

In another aspect of the invention, conference recordation and transmission control may be local to each individual (i.e., each user maintains control the recordation and transmission of his/her conference leg) or central to a single conference member (i.e., a moderator). The control features may also be passed from participant to participant or toggled from local control to central control.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
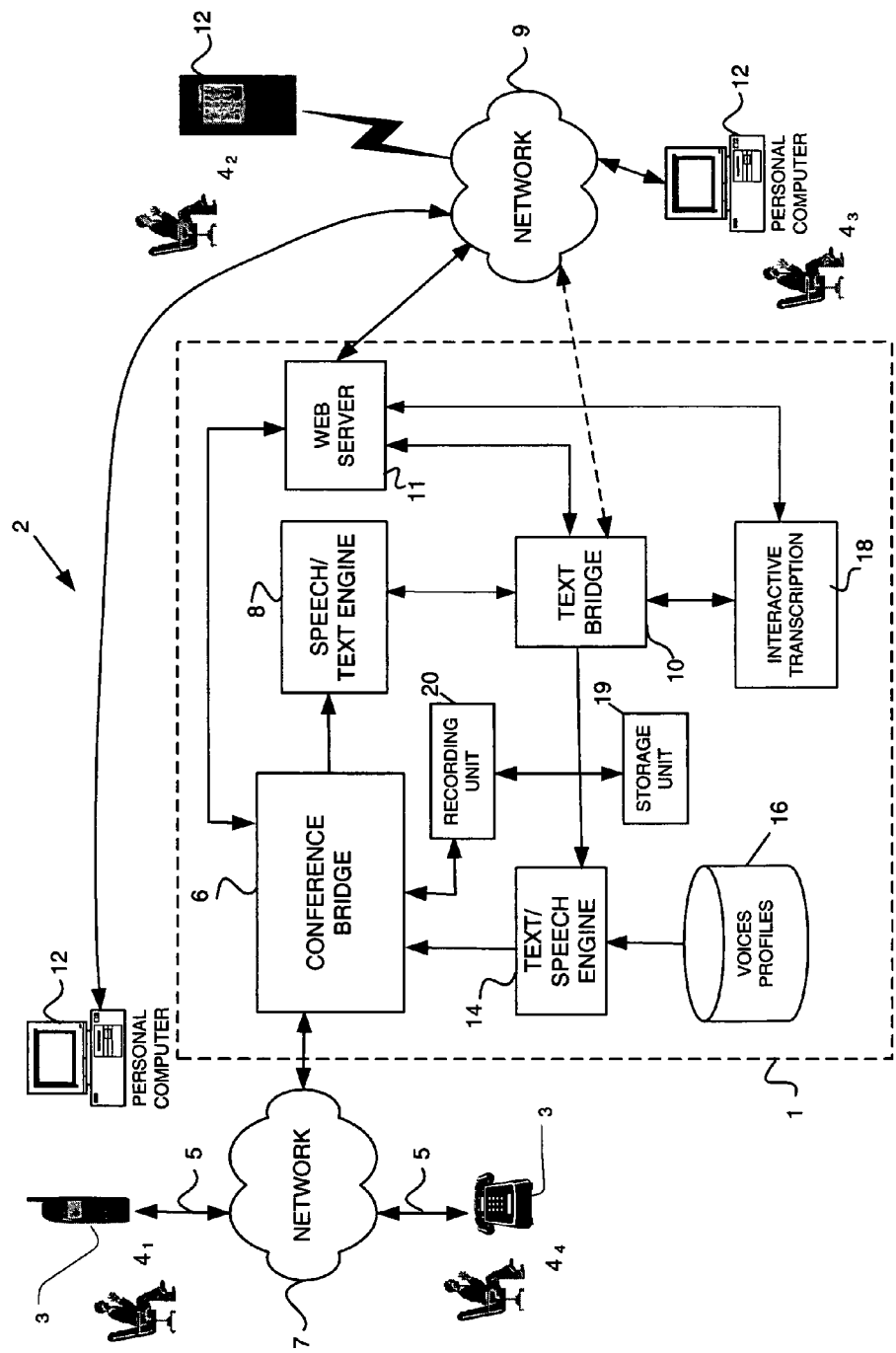
FIG. 1 is a schematic diagram of an exemplary telecommunication network environment in which an illustrative embodiment of the present invention may be implemented.

FIG. 1 illustrates a schematic diagram of one exemplary embodiment of a telecommunications network 2 for providing conference bridge service to one or more customers or subscribers $4_1, 4_2, 4_3, 4_4$. The operation of the network 2 will be described followed by a description of implementing a conferencing system 1 and method of providing conference-bridging services. It will be appreciated that the network connections shown are exemplary and other methods or ways of establishing communication links may be used. It is also to be understood that the disclosed embodiments of the invention can be applied to many types of telecommunications systems and network environments which can include a homogeneous network technology, such as Internet network 9 having TCP/IP protocol, and a heterogeneous network comprised of a plurality of differing network environments. The differing network environments may include, for example, a private network within a building or distributed across many locations or an intranet. Another network environment may include a local, national, international telecommunications Public Switched Telephone Network (PSTN) 7 that provides plain old telephone service (POTS) or Voice-over-IP (VoIP) service. Other network environments may include a CATV network (not shown) which provides telephony, a wireless or satellite telecommunications network (not shown) having cellular or Personal Communication Services (PCS) networks, cable television and/or other suitable telecommunications networks, such as X.25, ATM, SONET, IBM SNA, frame relay or the like.

With continued reference to FIG. 1, the inventive conferencing system 1 includes a teleconference bridge circuit 6 that receives one or more video signals, audio signals, text signals or images (i.e., documents, pictures, charts) from the subscribers $4_1$ and $4_4$ via one or more distinct communication legs (i.e. channels) or telephony links 5 from a telecommunications network, such as PSTN 7. It is to be understood that legs/links 5 are representative of circuit-switched or packet-switched (VoIP) communication pathways to the conference bridge 6. Conferencing system 1 may be located in a single central location. Alternatively, system 1 may be distributed across at least two or more locations physically, but may function as a single system logically via the network 2. Nevertheless, the two or more locations may be distinct from or congruent to the user locations containing the plurality of telecommunications devices 3.

Conference bridge 6 is provided so that a multi-party conference involving audio, video, text and/or still images may be conducted in which each of the participants can hear, talk to, send/receive text to/from and see all of the other participants (including images presented by the other participants), simultaneously. Conference bridge 6 includes hardware and software for mixing the plurality of audio and/or video signals from the subscribers via the communication or data channels 5, and optionally associates these signals with a source identifier. Additionally, conference bridge 6 may also include hardware and software for recording audio, video, text and image signals from the subscribers to maintain a record of the teleconference. In FIG. 1, the text bridge 10 is illustrated as an external unit to the conference bridge 6. However, one of skill in the art will appreciate that the text unit 10 may also be integrated into the conference bridge 6. In one example, conference bridge 6 may be coupled to an external recording unit 20 that handles the recordation of all audio and video signals received and output by the conference bridge 6. Conference bridge 6 may further store the recorded audio, video, text and/or images in a storage unit 19.

It should be appreciated that voice signals can originate from any appropriate telecommunication device or audio conferencing terminal 3 that provides audio telephony, such as a wire-line telephone, a wireless telephony device, a personal computer (not shown), a laptop with a voice modem (not shown), a telephony-enabled personal digital assistant (not shown), a palm-sized computer (not shown), or an IP-enabled telephone (not shown). Similarly, it will be appreciated that video signals may originate from any appropriate communication device or video conferencing terminal that provides for video transmission. Examples of such devices include videophones (not shown), personal computers (i.e., with a webcam, not shown), and multimedia conferencing systems (not shown). Text signals may be sent via any appropriate text input device. For example, such text input devices may include computing devices with a keyboard, a cellular phone with a keypad or a transcription device which converts speech to text. Additionally, still images (i.e., documents, charts, pictures) may also originate from a variety of image display devices such as electronic whiteboards, scanners and video projectors. The functionality of the conference bridge 6 may additionally include receiving audio, video, text and image signals from a multimedia conferencing system in which the audio, video, text and still image portions of the conferencing can be separated into distinct component signals.

In one arrangement, conferencing system 1 includes a speech-to-text engine/circuit 8 (STT) that creates a text-based representation of the spoken words or voice of the subscribers, while a participant is speaking or producing a plurality of phonemes or other parts of speech. In this process, unknown sounds may be ignored, or nonspecifically referenced. Optionally, the unknown sound may be converted into a digital file such as a "way file" and included in the text transcription for later playback. A participant viewing the transcription on a text-only device, such as a pager or PDA, would only see that a sound was part of the audio signal. A participant using a more capable device, such as a PC, could view the transcription and also click to hear the sound. Such a text file is known in the art as "rich text."

Illustrative Embodiments

Figure 2:
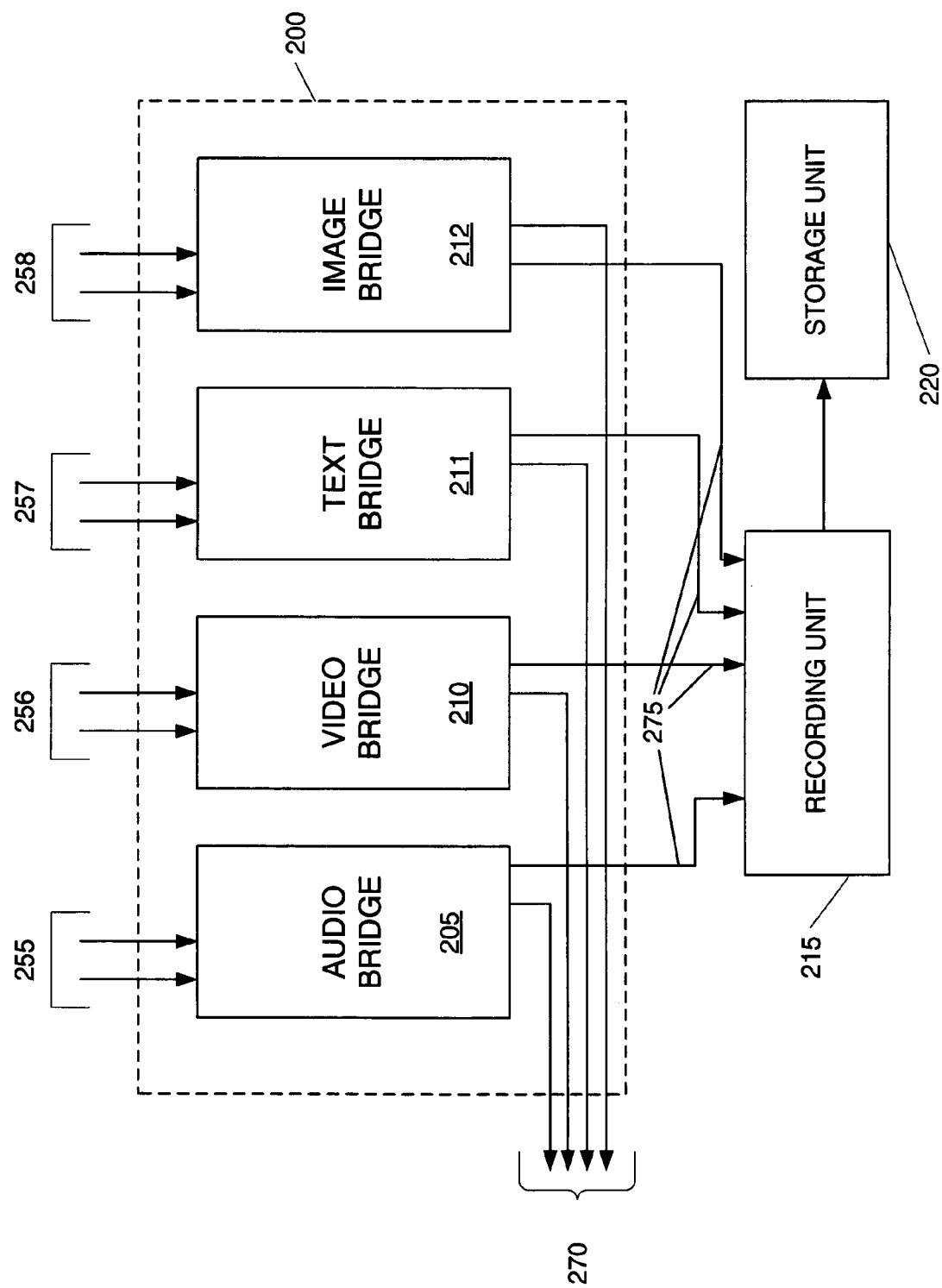
FIG. 2 illustrates a conference bridge system with recording and storage capabilities according to an illustrative embodiment of the present invention.

FIG. 2 illustrates a conference bridge system with recording and storage capabilities according to an illustrative embodiment of the present invention. To process received communication signals 255, 256, 257 & 258, the conference bridge 200 may include an audio bridge 205, a video bridge

210, a text bridge 211 and an image bridge 212 for handling the various communication signals 255, 256, 257 & 258 received from multiple teleconference participants. For example, a typical video teleconference usually includes both an audio stream and a video stream. Rather then using a single processing unit to handle the various types of communication signals, the teleconferencing system may employ a distinct bridge 205 for the audio and another 210 for the video. Using such dedicated bridges for the differing types of signals (i.e., audio, video, text and still image) may enhance processing efficiency and capabilities. However, one of skill in the art will appreciate that a single combined audio/video/text/image bridge unit may also achieve similar processing goals. After signal processing is complete, a recording unit 215 connected to the conference bridge may further modify the audio and video bridge outputs to package the bridge outputs for storage in a storage unit 220. The storage unit 220 may include a HD drive, optical storage media and tape media.

Generally, the various communication signals transmitted from an individual conference participant arrive in separate component signal streams 255, 256, 257 & 258. For example, video signals would be received in a video stream 256 while the text would be received in a distinct text stream 257. Beyond receiving the communication signals 255, 256, 257 & 258, the conference bridges 205, 210, 211 & 212 can further detect or extract identifiers associated with the individual signals so as to distinguish the various signal sources. Such source information may be derived in a multitude of ways and may depend on the method of signal transmission. For example, in a PSTN, engaging in telephonic communications generally involves establishing a dedicated circuit between the calling party and the answering or receiving party. Thus, for those participants using the PSTN, a conference bridge may differentiate those signals simply by identifying the circuit on which the signal was received. Similarly, in an IP network the source address would be different for each participant.

Additionally, a signal or stream may be distinguished based on predefined information native to the signal's transfer protocol (i.e., IP). For example, an audio and/or video signal received through a PSTN may contain a series of identification bits embedded in the signal using a technique such as frequency shift keying. Frequency shift keying, commonly used to send data to caller ID devices, uses different tones (or frequencies, i.e., 1200 Hz and 2200 Hz) to represent binary 1s and 0s. Upon translating the frequency shifts into a binary sequence, the sequence may then be processed and translated into identification data (i.e., a chain of ASCII characters representing a name, phone number, etc.). Alternatively, audio and video packets sent over an IP network may contain a header section that contains the originating IP address and other identifying information (i.e., name, phone number, etc.).

Once the source identification data has been resolved or extracted from the received signal, the conference bridges 205, 210, 211 & 212 may then begin processing the audio, video, text and image signals, respectively. Audio, video, text and image bridges 205, 210, 211 & 212 are generally processing units used in teleconferencing systems to handle a large volume of distinct signals and data streams. More specifically, these bridges may provide the resources to integrate numerous signals and data streams into a single output. The audio, video, text and image bridges, among other tasks, prepare the audio, video, text and image outputs, respectively, for broadcasting to the conference participants and for recordation and storage. The teleconferencing system may further include multiple distinct sets of outputs from the conference bridge system. For example, one set of outputs may be dedicated to the recording unit and storage, while another set is designed to broadcast the composed audio, video, text and image streams to the conference participants.

In one aspect of an embodiment of the invention, the conference bridge system 200 may further process the received communication signals by synchronizing the component signals 255, 256, 257 & 258. Because the audio, video, text and image data may arrive on separate input signals, the time of receipt may not be an accurate indication of, for example, when the text was entered or audio was spoken. Thus, the individual conference bridges 205, 210, 211 & 212 may synchronize the various communication signals to more accurately reflect a sequence of events or communications during the conference.

Additionally, signal processing may include determining whether a particular input signal should be integrated with a particular output signal. In one illustrative embodiment, the conference bridge system 200 may include two or more distinct outputs. The multiple outputs allow the conference bridge system 200 increased flexibility in controlling signal composition and transmission. For example, the conference bridge may include a signal output to a speech-to-text unit (not shown) for transcription of the teleconference. Additionally, the conference bridge unit 200 may output different signals for different destinations or targets (i.e., conference participants) in accordance with a variety of factors. Such factors may include user preferences, system filters and settings and potential limitations of a participant's telecommunications device.

In one example, the separation of recorded from non-recorded segments may consist of performing the mixing in two stages. At the first stage, all of the legs to be recorded are mixed into one stream, and all of the legs that are not to be recorded are mixed into a second stream. The stream to be record is delivered to the recording system. Then the two mixed streams are combined in a second stage into a single stream with all of the legs for broadcasting to all conference participants. Such a method may be used not only for audio and video signals, but also for text and images.

In FIG. 2, the conference bridge system is shown illustratively with two distinct sets of outputs. The broadcast outputs 270 are intended for transmission to conference participants whereas the recording outputs 275 may be directed to the recording unit 215 and storage. In accordance, the signal composition of each set of outputs 270 & 275 may differ significantly. For example, a conference participant may request that the recording of his conference leg be disabled. In response, the audio and video bridges 205 & 210 may disregard the audio and video signals originating from the designated conference leg when composing the audio and video output signals intended for the recording unit 215. Similarly, if the participant transmits text or still image data, those signals may also be excluded when preparing the recording outputs. However, the audio, video, text and/or image signals from the participant specified leg may still be included in the corresponding output signals composed for the broadcast outputs 270. The composition procedure may involve decompressing any compressed input signals, standardizing the signal formats for composition and subsequently compressing the composed output signal. Some examples of compression formats include MPEG Layer-3 (more commonly known as mp3) and AAC for audio, JPEG and GIF for still images and AVI and MPEG-2 for video. The type of compression may depend on a variety of factors including receiving/sending equipment compatibility, bandwidth and storage capacity. Again, different compression formats may be used for each individual output. Composition may further include processing routines designed to synchronize the audio and video streams according to the reception times of the signals and/or conforming each signal to a standard bit rate. Other processing routines may include adjusting the amplitude of each signal to compensate for soft speakers or sensitive microphones and detecting and eliminating line noise.

The recording unit 215 is then responsible for receiving the generated signal output from the audio, video, text and/or image bridges 205, 210, 211 & 212 and performing any further processing of the corresponding signal streams in preparation for storage. The recording unit 215 may include a processor for performing tasks such as applying compression algorithms to the audio and video streams and converting diverse compression formats prior to storage in the storage unit 220. In one example, the recording unit 215 may convert the audio, video and image output signals to a standard recording and storage compression format. This standard compression format may be pre-specified by a conference participant or defaulted to one compatible with the specifications (i.e., size) of the storage system 220.

Figure 3:
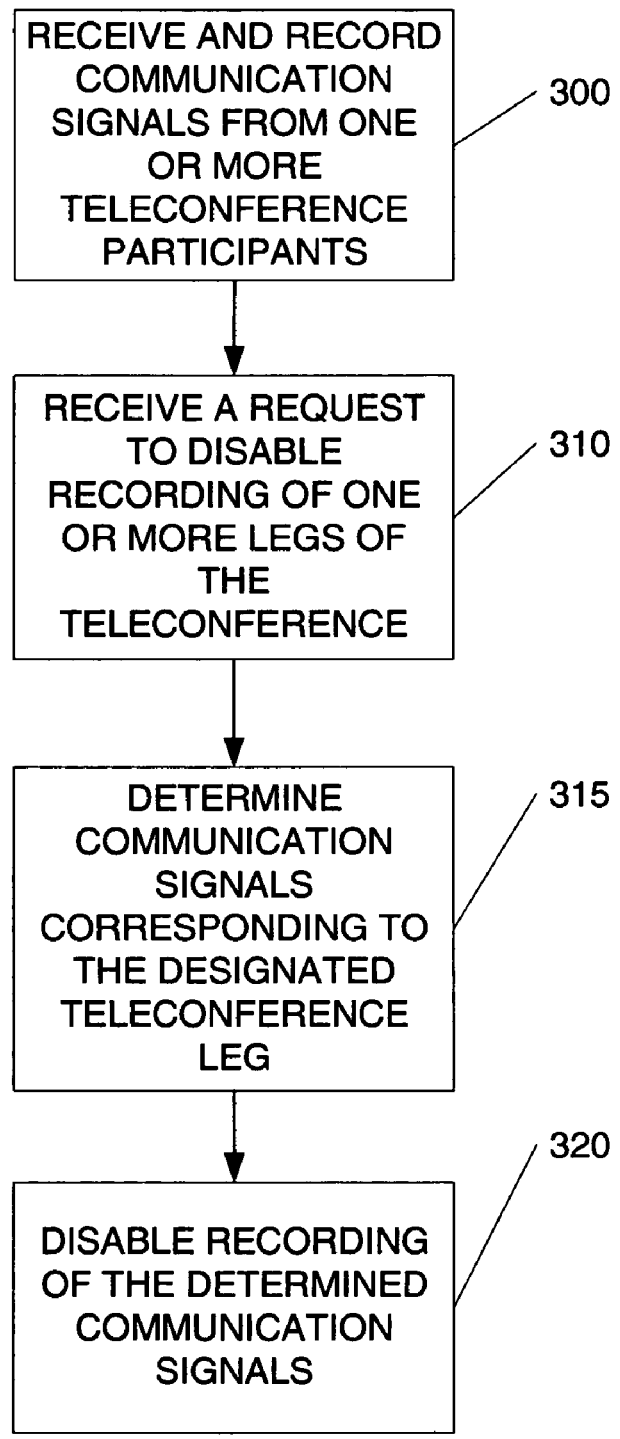
FIG. 3 is a flow chart of a method for disabling recording of a teleconference on a per-conference-leg basis according to an illustrative embodiment of the present invention.

FIG. 3 is a flow chart of a method for disabling recording of a teleconference on a per-conference-leg basis according to an illustrative embodiment of the present invention. In step 300, a conference bridge receives multiple audio, video, text and image signals 255, 256, 257 & 258 from multiple teleconference participants. As described previously with respect to FIG. 2, these signals are processed through the individual bridges 205, 210, 211 & 212 (or more generally, the conference bridge system 200) prior to being output to the recording unit 215 or broadcast to the teleconference participants.

In step 310, a teleconference participant may submit a request to disable recording of one or more legs of the teleconference. The teleconference participant may submit such a request in several ways. In one instance, the participant may interact with a web-based dialog to control and monitor the teleconference. In another example, the participant may use DTMF sequences to notify the conference bridge of the request. In IP telephony communication systems, the participant may issue the request through a VoIP (voice over IP) signaling channel in a SIP INFO message. Alternatively, a user may enter a series of text symbols that represents a code to disable recording rather than a message to other participants. Upon receiving the request to disable recordation, the conference bridge system may determine whether the requesting participant is authorized with the required level of control for the command. For example, the conference bridge system 200 may maintain a list of authorized conference participants that have specified privileges (i.e., recording, monitoring, etc.). The conference bridge system 200 may compare the participant's identity to the list and either grant or deny the request on the basis of the comparison.

Additionally, the teleconference participant may or may not specify a particular conference leg ID in the request. In the event no conference leg ID is submitted with the request, the bridge system 200 may interpret the lack of a designation to mean the requesting participant's own conference leg. A participant may specify a particular conference leg in a plurality of ways. In one example, a conference participant may send a request to disable a co-worker's recording using a DTMF sequence. The requesting participant may further specify the co-worker's conference leg by entering a pre-assigned conference leg number along with the DTMF sequence. In another example, a conference participant may submit the conference leg ID information in an IP data packet. Other forms of conference leg identification may include a name, a phone number (or extension) or an IP address.

Once a target conference leg ID has been resolved from the request, the conference bridge system then identifies the communication signals (i.e., audio, video, text and/or still image) corresponding to the conference leg in step 315. One method of identification is comparing the source identification data ascertained from the received communication signals (as described previously) to the specified target leg ID. The acquired source identification data may contain information that would match information specified by the conference leg ID. Alternatively, such a comparison may not be necessary if, for example, the multiple conference legs have been pre-assigned with identification numbers. In such an instance, the conference bridge system may use a signal source-to-identification number correspondence list or table to identify the correct audio and video source.

In step 320, the audio, video, text and image bridges, having identified the correct corresponding communication signals, may disable the recording of the specified signals. As previously described, the audio, video, text and image bridges use the multiple communication inputs, respectively, to compose one or more output signals for each set of outputs (i.e., broadcast or recordation). For example, in the case of audio signals, the audio bridge may synchronize and combine the received audio signals into a single audio output stream. With video signals, however, the video bridge may synchronize the signals without combining the received video signals prior to output. As such, the conference bridge system, and more specifically the video bridge, may output individual video outputs for each video input. In order to disable the recording of a specific conference leg, the audio, video, text and image bridges may exclude the audio, video, text and image signals associated with the specified conference leg from the recording output composition process. More specifically, the specified conference leg's communication signals would not be included in the composed recording output signal or signals. It is understood, however, that the communication signals corresponding to the specified conference leg may still be included in one or more of the other outputs (i.e., broadcast for the conference participants).

Figure 4:
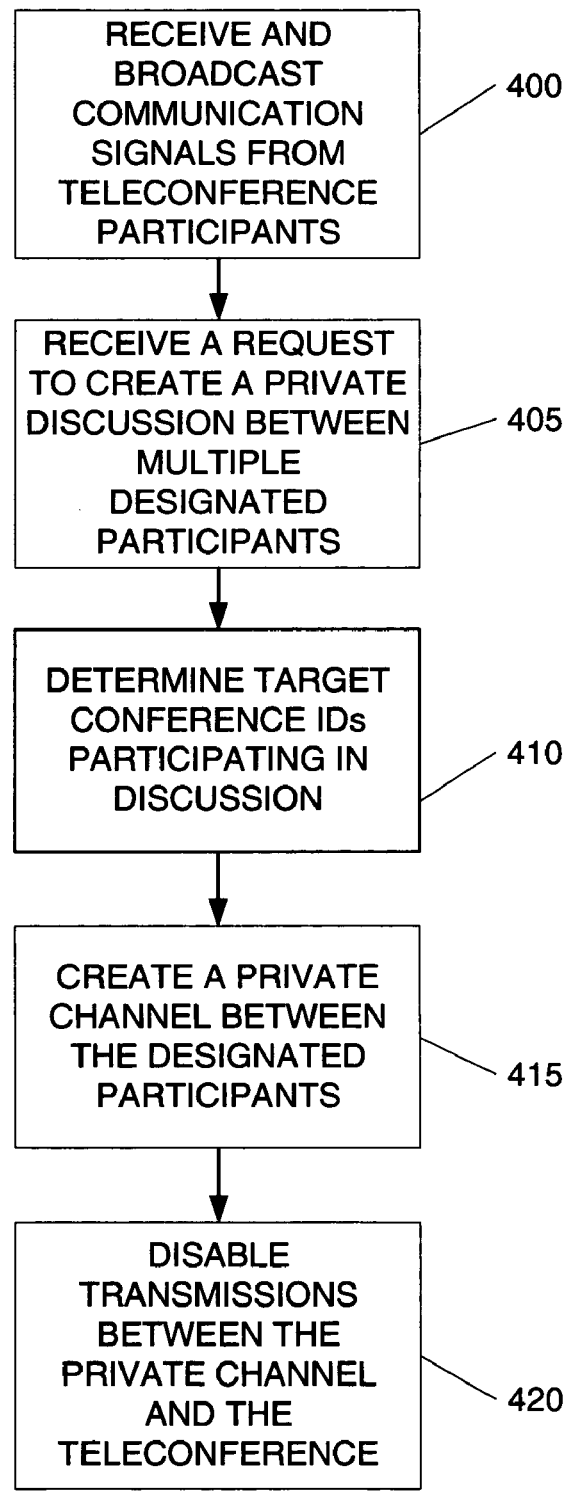
FIG. 4 is a flow chart of a method for providing private channels of audio and/or video communications during a teleconference according to an illustrative embodiment of the present invention.

FIG. 4 is a flow chart of a method for providing private channels of audio and/or video communications during a teleconference according to an illustrative embodiment of the present invention. At various points in a teleconference, a participant may wish to speak privately with one or more co-participants. The following method may be used to achieve such a feature.

In step 400, the conference bridge system receives and broadcasts communication signals from the teleconference participants. Similar to step 310 in FIG. 3, the communication signals are fed into the corresponding bridges and processed. The communication signals are analyzed, processed and composed into one or more output signals for each set of outputs. In step 405, the conference bridge system may receive a request from a conference participant to create a private discussion between himself or herself and one or more designated participants. Alternatively, a participant may submit the request to a conference moderator. The conference moderator may then approve the request and submit a request to the conference bridge system to create the private channel. In either case, the conference bridge system may evaluate the requesting party's authorization to make such a request. A conference creator may also setup the conference such that all participants have the ability to control the conference and rendering authorization unnecessary.

Upon authorization or receiving the request (if authorization is not needed), the conference bridge system may extract the conference leg ID designations from the request in step 410. Extracting the designations allows the conference bridge to determine which communication signals will be participating in the private discussion. The conference leg IDs may be specified and embedded in the request. For example, a participant using a web dialog to control the conference may send a packet request containing a list of the conference leg IDs that will be party to the private discussion. The communication signal sources corresponding to the specified leg IDs may be identified using methods similar to those described with respect to determination step 315 of FIG. 3. Once the communication signal sources associated with the specified conference leg IDs have been identified, the conference bridge system may then create a private channel between the designated conference legs in step 415. In one instance, the conference bridge system may also request confirmation from each specified conference leg or participant that they wish to participate in the private channel. If a participant replies in the negative, that participant's conference leg will be excluded from the private channel.

In reference to steps 415 and 420, the conference bridge system may establish a private channel by varying the output signals transmitted to non-private discussion participants and parties to the private channel. More specifically, the output signals to the non-participants of the private channel may include only the communication signals of other participants not participating in the private channel. Similarly, those participating in the private discussion may receive output signals that are composed only of the audio, video, text and/or image signals of other private channel participants. Thus, in step 420, the conference bridge system may effectively disable audio, video, text and image signal transmission between participants and non-participants. The output signals for the private channel participants may, alternatively, include the communication signals of non-participants depending on user preferences and specifications. For example, the audio of the non-private channel participants might be played at a lower volume in the background of the private channel conversation. The video of the non-private channel participants might be displayed in a small window on the video screen. To coordinate and facilitate the signal composition process, the conference bridge system may maintain one or more lists of participants corresponding to the different private channels. One of skill in the art will appreciate that other methods of redirecting and controlling signal transmission within a teleconference exist and may be implemented.

Figure 5:
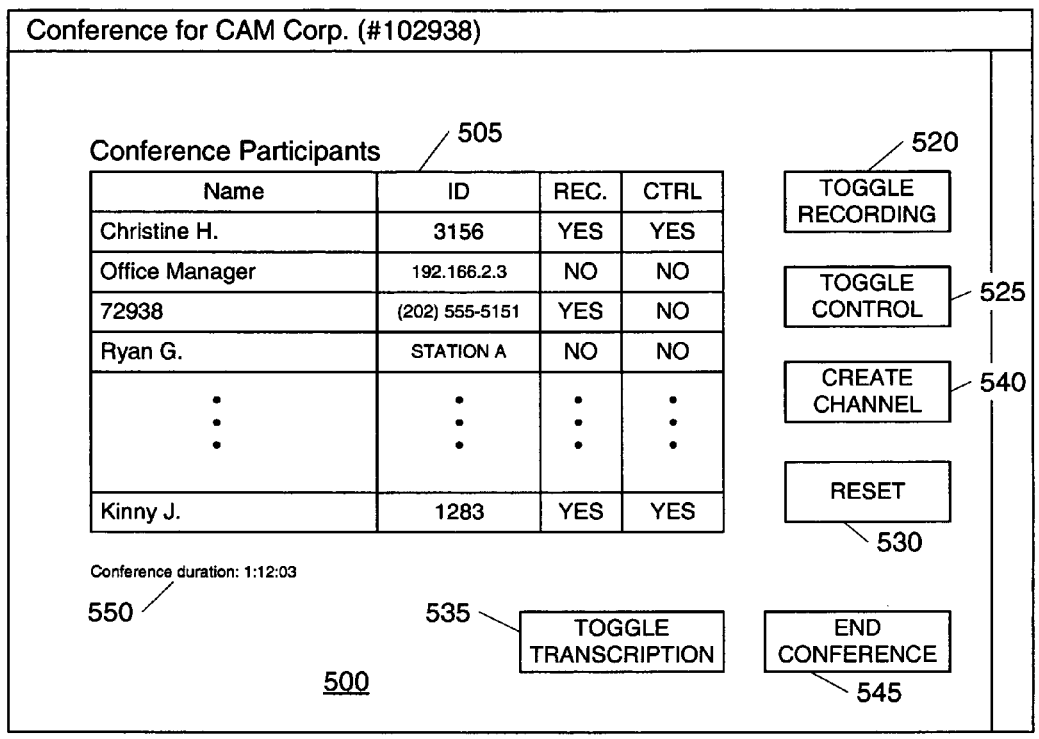
FIG. 5 is a web based control panel for toggling recording of conference legs according to an illustrative embodiment of the present invention.

FIG. 5 is a web based control panel for toggling recording of conference legs according to an illustrative embodiment of the present invention. The control page 500 may include a table 505 showing a list of the conference participants connected. The control page 500 may further include a toggle recording button 520, a toggle control button 525, a reset option 530, a transcription toggling button 535, a create channel button 540 and an end conference button 545. A counter 550 may maintain and record the running time of the conference.

The table 505 may convey a variety of information including a participant ID 515, a source identification 516, a recording status 517 and a control authorization field 518. The participant name may include a variety of identifiers including the participant's name, a job title (i.e., Office Manager) or an employee ID number. The source identification 516 may include information that represents a location or a device ID. For example, the source identification 516 may be a telephone extension corresponding to the telecommunications device being used by the participant. In another example, source identification may include a participant's name and telephone number as relayed by a method such as frequency shift keying. The source identification 516 may also include a telephone number, an IP address and/or a device name. It will be appreciated that there exists a multitude of identification information that may be used to convey source identification 516 and/or a participant ID 515. In addition, the recording status field 517 communicates whether a participant or conference leg is currently being recorded while the control authorization field 518 identifies participants who are permitted to alter the status and parameters of the teleconference.

Figure 6:
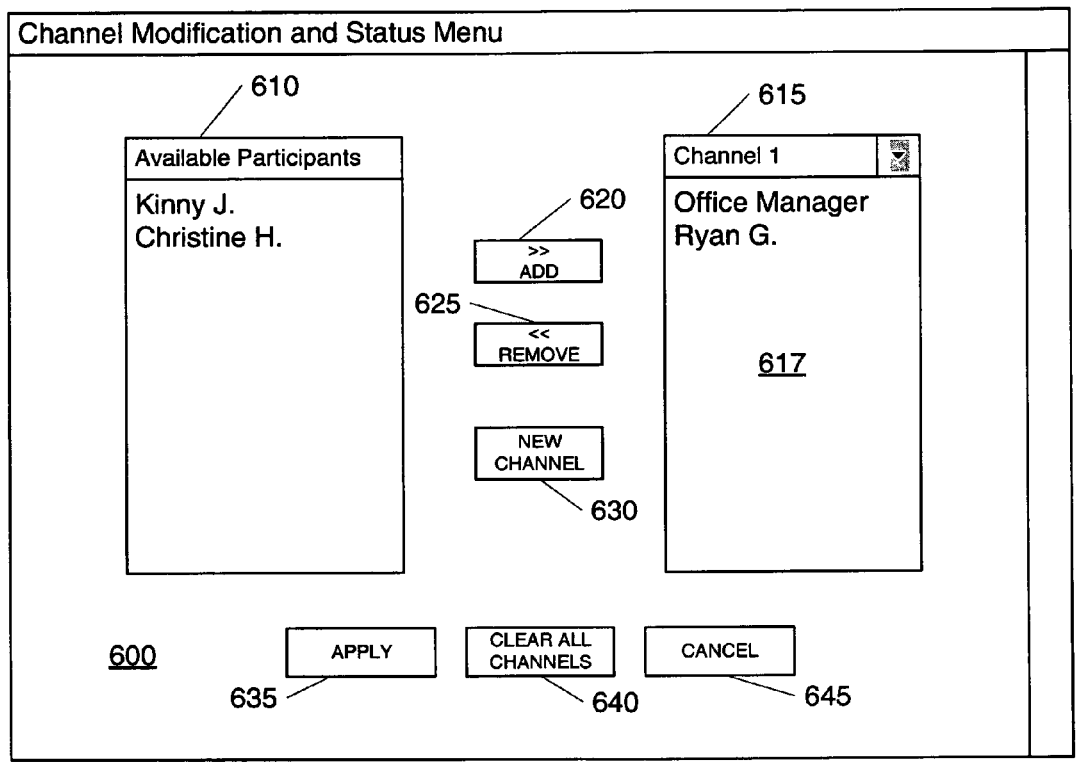
FIG. 6 illustrates a channel creation sub-dialog according to an illustrative embodiment of the invention.

The channel creation option 540 opens a sub-dialog that allows an authorized participant to create a private channel with one or more specified conference participants. FIG. 6 illustrates a channel creation sub-dialog according to an illustrative embodiment of the invention. The creation dialog 600 permits an authorized participant to view a list of available participant (i.e., not in any private channels) 610, a drop down menu of current channels 615 and a list of participants associated with the selected channel 617. The dialog may further include an add button 620, remove button 625 and a new channel button 630. The add and remove buttons 620 & 625 modify channel participation by either inserting or extracting participants to and from the channel, respectively. The new channel button 630, on the other hand, permits a conference moderator or participant to create an entirely new channel. The sub-dialog may provide a shortcut button 640 that clears and removes all channels currently in existence; in effect, shortcut 640 consolidates all participants in the original primary teleconference channel. Once a participant has completed the desired modifications to current channel composition, he or she may commit the changes using the apply option 635. The cancel button 645, however, allows the participant to eliminate any changes made that have not been already applied.

The present invention may be used in numerous applications including for the taking of depositions. In one example, a deposition consists of a witness, the witness's attorney, a court appointed transcriber and an opposing counsel. During the deposition, the witness's attorney and the opposing counsel often discuss stipulation and other information that they may wish to relate off-the-record. With the present invention, the recording of the conference legs for the witness's attorney and for the opposing counsel may be disabled prior to such discussions. Moreover, a private channel may be created so that the court appointed transcriber is not party to the discussion of sensitive information.

Additionally, aspects of the invention may further be implemented using computer readable instructions stored on a computer readable medium. Such instructions may be implemented in a variety of computing devices including a conference bridge to manage and control the communications to and from a conference bridge or other components described herein.

CONCLUSION

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of controlling recordation of a teleconference, comprising:
receiving, at a centralized conferencing system over a first communication pathway from a first remote source used by a first teleconference participant, at least one first communication signal;

receiving, at the centralized conferencing system over a second communication pathway from a second remote source disparate from the first remote source and used by a second teleconference participant, at least one second communication signal;

receiving, at the centralized conferencing system over a third communication pathway from a third remote source disparate from the first remote source and the second remote source and used by a third teleconference participant, at least one third communication signal;

receiving, at the centralized conferencing system, a request from one of the first teleconference participant, the second teleconference participant and the third teleconference participant, a request to disable recording of one of the received at least one first communication signal, at least one second communication signal, and at least one third communication signal, wherein multiple of the first teleconference participant, the second teleconference participant and the third teleconference participant are simultaneously authorized and enabled to request disabling of the at least one first communication signal, the at least one second communication signal, and the at least one third communication signal;

in response to the request, disabling recordation of the received one of the at least one first communication signal, at least one second communication signal, and at least one third communication signal for which the request is received, and recording each of the received others of the at least one first communication signal, at least one second communication signal, and at least one third communication signal; and relaying, from the centralized conferencing system, a first output signal that comprises the at least one first communication signal, at least one second communication signal, and at least one third communication signal, including the received one of the at least one first communication signal, at least one second communication signal, and at least one third communication signal for which the request was received, to the first remote source, the second remote source and the third remote source, wherein the centralized conferencing system disables recording of the at least one first communication signal, at least one second communication signal and at least one third communication signal upon request of any of the first teleconference participant, the second teleconference participant and the third teleconference participant.

2. The method of claim 1,
wherein the at least one first communication signal, at least one second communication signal, and at least one third communication signal each comprise an audio signal.

3. The method of claim 1,
wherein the at least one first communication signal, at least one second communication signal, and at least one third communication signal each comprise a video signal.

4. The method of claim 1, further comprising:
composing, at the centralized conferencing system, the first output signal that comprises the at least one first communication signal, at least one second communication signal, and at least one third communication signal.

5. The method of claim 1, further comprising:
receiving a request to authorize one of the first teleconference participant, the second teleconference participant or the third teleconference participant to disable recording; and adding the first teleconference participant, the second teleconference participant or the third teleconference participant requesting authorization to an authorization list responsive to a conference controller authorization input.

6. The method of claim 1,
wherein the receiving a request comprises receiving a message through an interne protocol (IP) network.

7. The method of claim 1,
wherein the request comprises a session initiation protocol (SIP) message.

8. The method of claim 1,
wherein the request comprises a predetermined Dual Tone Multi-Frequency (DTMF) sequence.

9. The method of claim 1, further comprising:
transcribing, at the centralized conferencing system, the at least one first communication signal, at least one second communication signal, and at least one third communication signal.

10. The method of claim 1, further comprising:
relaying to a recording unit of the centralized conferencing system, a second output signal that comprises each of the received others of the at least one first communication signal, at least one second communication signal and at least one third communication signal, and excluding from the second output signal the received one of the at least one first communication signal, at least one second communication signal, and at least one third communication signal.

11. A non-transitory computer readable medium storing computer executable instructions that, when executed by a processor, cause a centralized conferencing system to perform a method of controlling recordation of a teleconference comprising:

receiving, at the centralized conferencing system over a first communication pathway from a first remote source used by a first teleconference participant, at least one first communication signal;

receiving, at the centralized conferencing system over a second communication pathway from a second remote source disparate from the first remote source and used by a second teleconference participant, at least one second communication signal;

receiving, at the centralized conferencing system over a third communication pathway from a third remote source disparate from the first remote source and the second remote source and used by a third teleconference participant, at least one third communication signal;

receiving, at the centralized conferencing system, a request from one of the first teleconference participant, the second teleconference participant and the third teleconference participant, a request to disable recording of one of the received at least one first communication signal, at least one second communication signal, and at least one third communication signal, wherein multiple of the first teleconference participant, the second teleconference participant and the third teleconference participant are simultaneously authorized and enabled to request disabling of the at least one first communication signal, the at least one second communication signal, and the at least one third communication signal;

in response to the request, disabling recordation of the received one of the at least one first communication signal, at least one second communication signal, and at least one third communication signal for which the request is received, and recording each of the received others of the at least one first communication signal, at least one second communication signal, and at least one third communication signal; and relaying, from the centralized conferencing system, a first output signal that comprises the at least one first communication signal, at least one second communication signal, and at least one third communication signal, including the received one of the at least one first communication signal, at least one second communication signal, and at least one third communication signal for which the request was received, to the first remote source, the second remote source and the third remote source, wherein the centralized conferencing system disables recording of the at least one first communication signal, at least one second communication signal and at least one third communication signal upon request of any of the first teleconference participant, the second teleconference participant and the third teleconference participant.

12. The non-transitory computer readable medium of claim 11,
wherein the at least one first communication signal, at least one second communication signal, and at least one third communication signal each comprise an audio signal.

13. The non-transitory computer readable medium of claim 11,
wherein the at least one first communication signal, at least one second communication signal, and at least one third communication signal each comprise a video signal.

14. The non-transitory computer readable medium of claim 11, wherein the method further comprises:
composing, at the centralized conferencing system, the first output signal that comprises the at least one first communication signal, at least one second communication signal, and at least one third communication signal.

15. The non-transitory computer readable medium of claim 11, wherein the method further comprises:
receiving a request to authorize one of the first teleconference participant, the second teleconference participant or the third teleconference participant to disable recording; and
adding the first teleconference participant, the second teleconference participant or the third teleconference participant requesting authorization to an authorization list responsive to a conference controller authorization input.

16. The non-transitory computer readable medium of claim 11,
wherein the request comprises a message received through an internet protocol (IP) network.

17. The non-transitory computer readable medium of claim 11,
wherein the request comprises a session initiation protocol (SIP) message.

18. The non-transitory computer readable medium of claim 11,
wherein the request comprises a predetermined dual tone multi-frequency (DTMF) sequence.

19. The non-transitory computer readable medium of claim 11, wherein the method further comprises:
transcribing, at the centralized conferencing system, the at least one first communication signal, at least one second communication signal, and at least one third communication signal.

20. A centralized conferencing system for controlling recordation of a teleconference, comprising:
a bridge that receives, over a first communication pathway from a first remote source used by a first teleconference participant, at least one first communication signal; that receives, over a second communication pathway from a second remote source disparate from the first remote source and used by a second teleconference participant, at least one second communication signal; and that receives, over a third communication pathway from a third remote source disparate from the first remote source and the second remote source and used by a third teleconference participant, at least one third communication signal;

a request receiver that receives, at the centralized conferencing system, a request from one of the first teleconference participant, the second teleconference participant and the third teleconference participant, a request to disable recording of one of the received at least one first communication signal, at least one second communication signal, and at least one third communication signal, wherein multiple of the first teleconference participant, the second teleconference participant and the third teleconference participant are simultaneously authorized and enabled to request disabling of the at least one first communication signal, the at least one second communication signal, and the at least one third communication signal; and a recorder that, in response to the request, disables recordation of the received one of the at least one first communication signal, at least one second communication signal, and at least one third communication signal for which the request is received, and records each of the received others of the at least one first communication signal, at least one second communication signal, and at least one third communication signal; and a relay that relays a first output signal that comprises the at least one first communication signal, at least one second communication signal, and at least one third communication signal, including the received one of the at least one first communication signal, at least one second communication signal, and at least one third communication signal for which the request was received, to the first remote source, the second remote source and the third remote source, wherein the centralized conferencing system disables recording of the at least one first communication signal, at least one second communication signal and at least one third communication signal upon request of any of the first teleconference participant, the second teleconference participant and the third teleconference participant.

* * * * *